(12) United States Patent
Wang

(10) Patent No.: US 10,380,974 B2
(45) Date of Patent: Aug. 13, 2019

(54) VEHICLE AUXILIARY DISPLAY DEVICE, DISPLAY METHOD AND VEHICLE

(71) Applicant: BOE Technology Group Co., Ltd., Beijing (CN)

(72) Inventor: Zifeng Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/566,400

(22) PCT Filed: May 5, 2017

(86) PCT No.: PCT/CN2017/083232
§ 371 (c)(1),
(2) Date: Oct. 13, 2017

(87) PCT Pub. No.: WO2018/036203
PCT Pub. Date: Mar. 1, 2018

(65) Prior Publication Data
US 2018/0301115 A1 Oct. 18, 2018

(30) Foreign Application Priority Data
Aug. 24, 2016 (CN) .......................... 2016 1 0720919

(51) Int. Cl.
G09G 5/10 (2006.01)
B60R 1/00 (2006.01)
(Continued)

(52) U.S. Cl.
CPC ................. *G09G 5/10* (2013.01); *B60R 1/00* (2013.01); *G09G 5/14* (2013.01); *H04N 7/18* (2013.01);
(Continued)

(58) Field of Classification Search
CPC .... G09G 5/10; G09G 5/14; G09G 2320/0626; G09G 2320/0686; H04N 21/41422
See application file for complete search history.

(56) References Cited

U.S. PATENT DOCUMENTS

2006/0290482 A1* 12/2006 Matsumoto .......... B60Q 1/2665
340/436
2007/0010944 A1* 1/2007 Ferrebee, Jr. .......... G08G 1/166
701/301
(Continued)

FOREIGN PATENT DOCUMENTS

CN 103813926 A 5/2014
CN 104369698 A 2/2015
(Continued)

OTHER PUBLICATIONS

Aug. 11, 2017—(WO) International Search Report and Written Opinion Appn PCT/CN2017/083232 with English Tran.

Primary Examiner — Antonio A Caschera
(74) Attorney, Agent, or Firm — Banner & Witcoff, Ltd.

(57) ABSTRACT

A vehicle auxiliary display device, which includes a display unit and a processor. The display unit is configured to display according to instructions from the processor. The processor is configured to acquire the current driving speed of the vehicle and, according to the current driving speed, match a display effect of a partial display area of the display unit to the current driving speed so as to enhance the display effect of the partial display area relative to the remaining display area of the display unit.

16 Claims, 4 Drawing Sheets

(51) Int. Cl.
*H04N 7/18* (2006.01)
*G09G 5/14* (2006.01)

(52) U.S. Cl.
CPC ..... *B60R 2300/202* (2013.01); *B60R 2300/70* (2013.01); *G09G 2320/0261* (2013.01); *G09G 2320/0626* (2013.01); *G09G 2320/0686* (2013.01); *G09G 2380/10* (2013.01)

(56) References Cited

U.S. PATENT DOCUMENTS

| | | | |
|---|---|---|---|
| 2014/0223497 A1 | 8/2014 | Eireiner et al. | |
| 2015/0145997 A1 | 5/2015 | Terashima | |
| 2018/0018939 A1* | 1/2018 | Choi | B60K 35/00 |
| 2018/0162225 A1* | 6/2018 | Webb | B60K 35/00 |

FOREIGN PATENT DOCUMENTS

| | | |
|---|---|---|
| CN | 104660980 A | 5/2015 |
| EP | 1731364 A1 | 12/2006 |
| JP | 2006264574 A | 10/2006 |
| JP | 2006298226 A | 11/2006 |

\* cited by examiner ively to the remaining display area of the display unit; and the display unit is configured to display images according to instructions from the processor.

VEHICLE AUXILIARY DISPLAY DEVICE, DISPLAY METHOD AND VEHICLE

The application is a U.S. National Phase Entry of International Application No. PCT/CN2017/083232 filed on May 5, 2017, designating the United States of America and claiming priority to Chinese Patent Application No. 201610720919.7 filed on Aug. 24, 2016. The present application claims priority to and the benefit of the above-identified applications and the above-identified applications are incorporated by reference herein in their entirety.

FIELD OF THE DISCLOSURE

Embodiments of the present disclosure relate to a vehicle auxiliary display device, a display method and a vehicle including the vehicle auxiliary display device.

BACKGROUND

At present, vehicles, as one of the common means for transportation, have entered innumerable families. With the popularization of vehicles, safety problems of vehicle driving have become increasingly of concern, and the most common safety problem especially relates to blind zones formed by A pillars of vehicles. A pillars are pillars connecting the roof and the nose cabin of a vehicle in left and right front. Pillars of a vehicle serve both as supports and as portions of a door frame. Pillars, especially A pillars, may lead to blind zones for visual field of the driver. The sectional dimension of an A pillar faces a difficult choice. If it is undersized, the bearing capacity in fortuitous events may be affected, and if it is oversized, the visual field of the driver may be influenced. Both of the two cases may be adverse to safety.

SUMMARY

One of the objectives of this disclosure is providing a vehicle auxiliary display device, a display method corresponding to the vehicle auxiliary display device, to solve the technical problem of optimizing the display effect of A pillar blind zones display screen.

According to at least one embodiment of this disclosure, a vehicle auxiliary display device is provided, comprising a display unit and a processor, wherein the processor is configured to acquire the current driving speed of a vehicle and according to the current driving speed match the display effect of a partial display area of the display unit to the current driving speed so as to enhance the display effect of the partial display area relatively to the remaining display area of the display unit; and the display unit is configured to display images according to instructions from the processor.

For example, the device further comprises an image acquiring unit, the display unit comprises at least a first area and a second area, the image acquiring unit is configured to acquire first images and sends the first images to the processor; the processor is configured to process the first parts of the first images displayed in the first area or the second parts of the first images displayed in the second area according to the current driving speed to enhance the display effect of the first area or the second area; and the processor sends the processed first images to the display unit.

For example, the first area is used to display images of distant scenes at a distance from the vehicle larger than a first distance threshold; the second area is used to display images of near scenes at a distance from the vehicle smaller than the first distance threshold; and the processor is further configured to process the first parts of the first images in such a way to enhance the display effect of the first area when the current driving speed is higher than the first speed threshold and to process the second parts of the first images in such a way to weaken the display effect of the second area when the current driving speed is lower than the first speed threshold.

For example, the processor is further configured to process the second parts of the first images in such a way to weaken the display effect of the second area when the current driving speed is higher than the first speed threshold.

For example, the processor is further configured to process the first parts of the first images to weaken the display effect of the first area when the current driving speed is lower than the first speed threshold.

For example, the display device further comprises a plurality of light sources, the plurality of light sources are respectively disposed on at least one side of the first area and at least one side of the second area of the display unit, and the processor is further configured to turn on the light sources on at least one side of the first area or those on at least one side of the second area to enhance the display effect of the first or second area according to the current driving speed.

For example, the display unit further comprises a third area that is located between the first area and the second area and used to display the third parts of the first images; and the processor is further configured to process the first parts of the first images displayed in the first area, the second parts of the first images displayed in the second area or the third parts of the first images displayed in the third area according to the current driving speed so as to enhance the display effect of the first, second or third area.

For example, the first area is used to display images of distant scenes at a distance from the vehicle larger than the first distance threshold; the second area is used to display images of near scenes at a distance from the vehicle smaller than the second distance threshold, the second distance threshold being smaller than the first distance threshold; and the third area is used to display images of scenes at a distance from the vehicle ranged between the first distance threshold and the second distance threshold.

For example, the processor is further configured to process the first parts of the first images to enhance the display effect of the first area when the current driving speed is higher than the first speed threshold; process the second parts of the first images to enhance the display effect of the second area when the current driving speed is lower than the second speed threshold; and process the third parts of the first images to enhance the display effect of the third area when the current driving speed is higher than the second speed threshold and lower than the first speed threshold.

For example, the processor is further configured to enhance the display effect of one of the first, second third areas and meanwhile weaken the display effect of the other two areas.

For example, a plurality of light sources included in the display device are respectively disposed on at least one side of the first area, at least one side of the second area and at least one side of the third area of the display unit, and the processor is further configured to turn on the light sources around the first area, the second area or the third area according to the current driving speed so as to enhance the display effect of the first, second or third area.

According to at least one aspect of this disclosure, a display method for a vehicle auxiliary display device is provided, the auxiliary display device comprises a display unit and a processor and the display method comprising: acquiring the current driving speed of the vehicle and according to the current driving speed matching the display effect of a partial display area of the display unit to the current driving speed to make it enhanced relatively to the remaining display area of the display unit by the processor; and displaying images by the display unit according to instructions from the processor.

For example, the display device further comprises an image acquiring unit, and the display unit comprises at least a first area and a second area, the image acquiring unit acquires first images and sends the first images to the processor; the processor processes the first parts of the first images displayed in the first area or the second parts of the first images displayed in the second area according to the current driving speed to enhance the display effect of the first area or the second area; and the processor sends the processed first images to the display unit for display.

For example, the first area is used to display images of distant scenes at a distance from the vehicle larger than the first distance threshold; the second area is used to display images of near scenes at a distance from the vehicle smaller than the first distance threshold; and the processor processes the first parts of the first images to enhance the display effect of the first area when the current driving speed is higher than the first speed threshold and processes the second parts of the first images to enhance the display effect of the second area when the current driving speed is lower than the first speed threshold.

For example, when the current driving speed is higher than the first speed threshold, the processor processes the second parts of the first images to weaken the display effect of the second area.

For example, when the current driving speed is lower than the first speed threshold, the processor processes the first parts of the first images to weaken the display effect of the first area.

For example, the display device further comprises a plurality of light sources, the plurality of light sources are disposed respectively on at least one side of the first area and at least one side of the second area of the display unit, and the processor turns on the light sources on at least one side of the first area or those on at least one side of the second area according to the current driving speed to enhance the display effect of the first area or the second area.

For example, the display unit further comprises a third area that is located between the first area and the second area and used to display the third parts of the first images; and the processor processes the first parts of the first images displayed in the first area, the second parts of the first images displayed in the second area and the third parts of the first images displayed in the third area to enhance the display effect of the first, second or third area.

For example, the first area is used to display images of distant scenes at a distance from the vehicle larger than the first distance threshold; the second area is used to display images of near scenes at a distance from the vehicle smaller than the second distance threshold, the second distance threshold being smaller than the first distance threshold; and the third area is used to display images of scenes at a distance from the vehicle ranged between the first distance threshold and the second distance threshold.

For example, when the current driving speed is higher than the first speed threshold, the processor processes the first parts of the first images to enhance the display effect of the first area; when the current driving speed is lower than the second speed threshold, the processor processes the second parts of the first images to enhance the display effect of the second area; and when the current driving speed is higher than the second speed threshold and lower than the first speed threshold, processor processes the third parts of the first images to enhance the display effect of the third area.

For example, while the display effect of one of the first, second and third areas is enhanced, the display effect of the other two areas is weakened.

For example, the display device comprises a plurality of light sources disposed respectively on at least one side of the first area, at least one side of the second area and at least one side of the third area of the display unit, and the processor turns on the light sources around the first area, those around the second area or those around the third area according to the current driving speed to enhance the display effect of the first, second or third area.

According to at least one embodiment of this disclosure, a vehicle is provided, comprising the vehicle auxiliary display device.

In embodiments of the present disclosure, images of areas blocked by A pillars that are displayed by a display unit may be optimized according to the driving speed of the vehicle, so that the display effect of traffic conditions concerning the driver is enhanced and driving safety is improved.

BRIEF DESCRIPTION OF DRAWINGS

For clearer explanation of technical solutions in embodiments of the present disclosure, figures involved in the description of the embodiments will be briefly introduced in the following. Accompanying drawings involved in the following description are only provided to illustrate embodiments of the present disclosure.

DETAILED DESCRIPTION

In the following, preferred embodiments of the present disclosure will be described in details with reference to accompanying figures. It is to be noted that in the present specification and the accompanying figures identical reference labels are used to represent the basically identical steps and elements and redundant explanation of those steps and elements will be omitted.

In the following embodiments of the present disclosure, the term "vehicle" refers to a vehicle that is used to carry persons or objects, driven by power, and has three or more wheels not borne on rails, such as a closed-top motor tricycle, a car, a truck or the like. The following contents of the present disclosure will be described with an automobile taken as an example.

Moreover, in travelling of a vehicle, scenes and situations concerning the driver may vary as the driving speed changes. For example, the higher the driving speed is, the farther the visual field concerning the driver is, while the lower the driving speed is, the nearer the visual field concerning the driver is. If the display screen disposed on an A pillar to display blocked areas cannot adjust its display effect according to real-time situations in vehicle travelling, it still cannot satisfy attention needs of the driver very well and may bring about some potential safety hazards.

Figure 1:
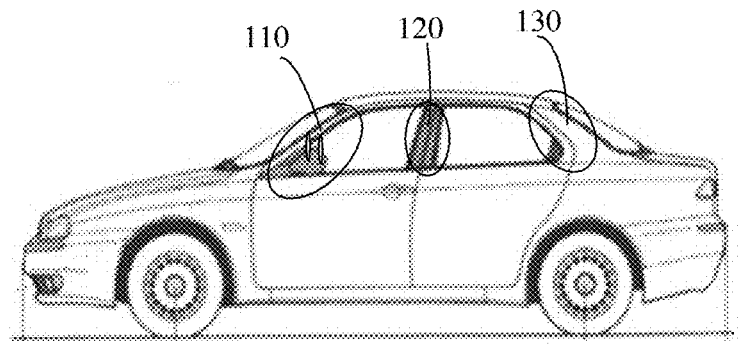
FIG. 1 is a structure diagram illustrating pillars of a vehicle according to an embodiment of the present disclosure.

FIG. 1 shows a structure diagram of pillars of a vehicle according to an embodiment of the present disclosure. With reference to FIG. 1, a vehicle 100 generally includes three types of pillars, i.e. A pillars 110, B pillars 120 and C pillars 130 in a from-front-to-back order. Although FIG. 1 only shows the pillars on the left side, those skilled in the art should understand that the A, B and C pillars are also disposed on the right side at locations corresponding to those on the left side. The vehicle auxiliary display device and the display method in embodiments of the present disclosure may be applied both to A pillars to solve the problem of blind zones caused by A pillars and to B and C pillars to solve the problem of blind zones caused by B and C pillars, for example, the areas blocked by B and C pillars in backing and parking of the vehicle. Hereafter, the system and method in the present disclosure will be introduced only with A pillars taken as an example, those skilled in the art can also achieve auxiliary display devices for B and C pillars based on a similar approach.

Figure 2:
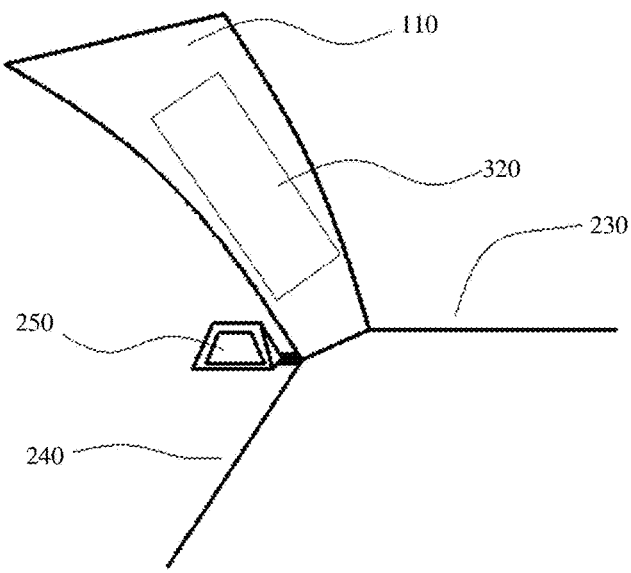
FIG. 2 is a schematic diagram of an A pillar and an A pillar display screen of a vehicle according to an embodiment of the present disclosure.

FIG. 2 is schematic diagram of an A pillar and an A pillar display screen of a vehicle according to an embodiment of the present disclosure. With reference to FIG. 2, in a vehicle, assuming that the driver sits on the left side, in front of him is the front window 230 for the driver's seat and on his left side is the side window 240 for the driver's seat, and when the driver sits on the driver's seat, he can see a display unit disposed on an A pillar 320 and a rearview mirror 250. Of course, the vehicle auxiliary display device in the embodiment of the present disclosure may also be disposed on the other A pillar of the vehicle as required so as to assist the driver to see the area blocked by the other A pillar on the other side of the vehicle, or disposed on a B or C pillar to make it convenient for the driver to determine the surrounding environment when backing, parking and warehousing the vehicle.

Figure 3:
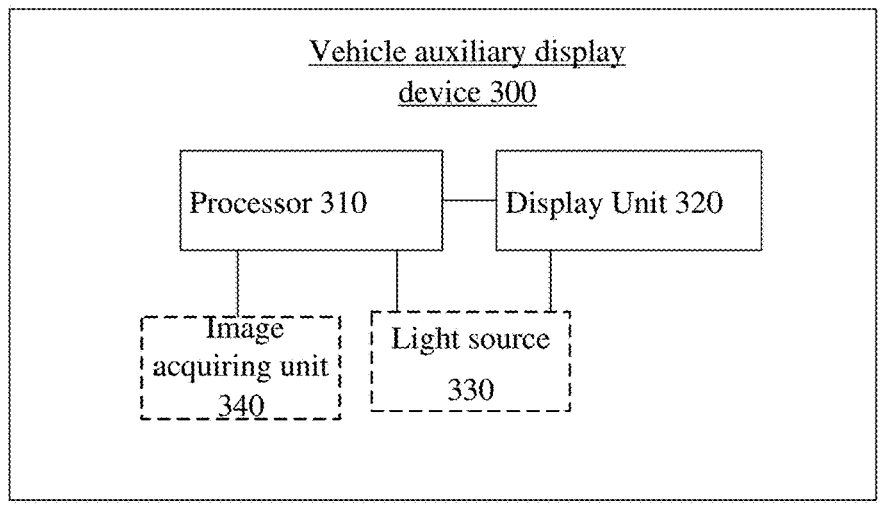
FIG. 3 is a structure diagram of a vehicle auxiliary display device according to an embodiment of the present disclosure.

FIG. 3 is a structure diagram of a vehicle auxiliary display device according to an embodiment of the present disclosure. With reference to FIG. 3, the vehicle auxiliary display device 300 includes a processor 310 and a display unit 320. The processor 310 may be a general purpose processor, for example, a CPU (central processing unit), or an application-specific processor, such as a programmable logic circuit etc. The display unit 320 may be, for example, a liquid crystal display or an OLED display, or have touch functionality and the like. The display unit 320 may be, for example, a display component of a display screen, a projector, or virtual reality (VR) or augmented reality (AR) glasses. Of course, those skilled in the art should understand that the vehicle auxiliary display device 300 may further include an image acquiring unit 340 used to acquire (e.g. shoot) first images of areas blocked by pillars of the vehicle, which may be sent to the processor 310.

After the vehicle auxiliary display device 300 is activated, if required for use, the first images of the areas blocked by pillars of the vehicle are received and sent to the display unit 320 by the processor 310. For example, the processor 310 may receive the first images from the image acquiring unit 340 and send the images to the display unit 320 for display. The display unit 320 receives the first images from the processor 310 and displays the first images according to instructions from the processor 310.

When the vehicle is started, the processor 310 may further acquire the current driving speed of the vehicle and according to the current driving speed match the display effect of a partial display area of the display unit to the current driving speed to make it enhanced relatively to the remaining display area of the display unit. For example, the faster the speed of the vehicle is, the farther the visual field concerning the driver is. At this point, the processor 310 may, for example, turn on the light sources of the display area for display of traffic conditions in the distance, or processes images of this display area so as to display the current images of traffic conditions in the distance with ultra high definition. When the driving speed is low, the visual field concerning the driver is near, and thus the light sources of the display area for display of traffic conditions in the vicinity may be turned on or images of this display area may be processed, so as to enhance the display effect of images of traffic conditions in the vicinity. It should be understood by those skilled in the art that various manners in which the display effect is enhanced may be used in combination. For example, turning on the light sources of a partial area is used in combination with processing images to be displayed in this partial display area, so that the display effect of the partial display area of the display unit 320 is matched to the current driving speed and thus enhanced relatively to the remaining display area of the display unit 320. Thereafter, the processor 310 may send the first images to the display unit 320.

Figure 4A:
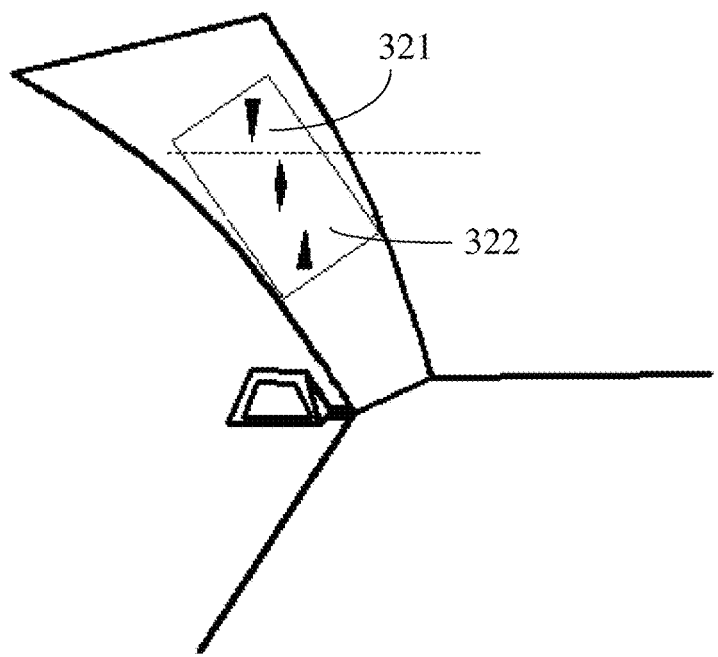
FIG. 4a is a schematic diagram illustrating a partitioning mode of areas of an A pillar display screen according to an embodiment of the present disclosure.

In order to further adjust the display effect of the display unit 320 based on the driving speed, according to an embodiment of the present disclosure, as shown in FIG. 4a, the display unit 320 may be divided into a first area 321 and a second area 322. The first area 321 is the upper part of the display unit 320 as shown over the dashed line. The second area 322 is the lower part of the display unit 320 as shown under the dashed line. When the vehicle is traveling at a high speed, for example, 80 km/h, traffic conditions in the distance are mainly displayed in the upper first area 321, so that the driver pays attention to the first area 321. The processor 310 may adjust and therefore enhance the display effect of the first area 321, for example, to increase the brightness and/or resolution of the first area 321. When the vehicle is traveling at a low speed, for example, 30 km/h, traffic conditions in the vicinity are mainly displayed in the lower second area 322, so that the driver pays attention to the second area 322. The processor 310 may adjust and therefore enhance the display effect of the second area 322, for example, to increase the brightness and/or resolution of the second area 322. For example, all the above-mentioned display parameters may be set by user inputs.

According to an example of the present disclosure, a first distance threshold may be predefined to represent the distance between the vehicle and a location external to the vehicle. The first distance threshold may be set as required and for example it may be 10 m, 20 m, 50 m etc. The first area 321 is used to display images of distant scenes at a distance from the vehicle larger than the first distance threshold. The second area 322 is used to display images of near scenes at a distance from the vehicle smaller than the first distance threshold. A first image displayed on the display unit 320 is divided into two parts. The first part is what the first area 321 displays and the second part is what the second area 322 displays. The processor 310 may determine the current driving speed of the vehicle with, for example, GPS; when the current driving speed is higher than the first speed threshold (e.g. 50 km/h, 60 km/h or 80 km/h), the first parts of the first images displayed in the first area of the display unit 320 are processed to enhance their display effect. When the current driving speed is lower than the first speed threshold, the processor 310 may process the second parts of the first images to enhance the display effect of what the second area 322 displays. Both of the distance threshold and the speed threshold mentioned above may be set by user inputs.

In order to further enhance the display effect of the area concerning the driver, according to another example of the present disclosure, when the current driving speed is higher than the first speed threshold, the processor 310 may process the first parts of the first images displayed in the first area 321 in such a way to enhance the display effect of the first area and process the second parts of the first images displayed in the second area 322 in such a way to weaken the display effect of the second area. Then the display effect of the first area 321 may be further enhanced relatively by weakening the display effect of the second area 322. In a similar way, when the current driving speed is lower than the first speed threshold, the processor 310 may process the second parts of the first images displayed in the second area 322 in such a way to enhance the display effect of the second area and meanwhile process the first parts of the first images displayed in the first area 321 in such a way to weaken the display effect of the first area. Then the display effect of the second area may be enhanced relatively by weakening the display effect of the first area in a like manner.

The method of enhancing display effects may be, for example, increasing contrast, brightness or resolution or any other image processing method. The method of weakening display effect may be, for example, blurring the display image, converting a color image into a gray-scale image, adjusting the brightness downwards etc.

Figure 5:
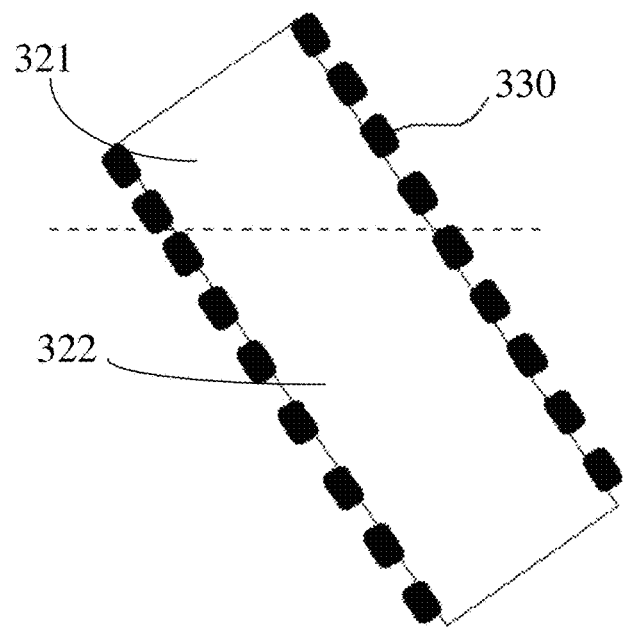
FIG. 5 is a schematic diagram illustrating light sources for an A pillar display screen according to an embodiment of the present disclosure.

In order to further improve the display effect of the first area or the second area, as shown in FIG. 3, in an embodiment of the present disclosure, the vehicle auxiliary display device 300 may further include a plurality of light sources 330. The light sources 330 may, for example, be cold-cathode fluorescent lamps (CCFL), light emitting diodes (LED) or other light sources. One or more light sources 330 may be disposed on one side or both sides of the first area 321 and/or second area 322 of the display unit 320. As shown in FIG. 5, a plurality of LEDs may be disposed on both sides of the first area 321 and the second area 322 of the display unit 320. For another example, the light sources corresponding to the first area 321 may be disposed on the upper side of the display unit 320 and the light sources corresponding to the second area 322 may be disposed on the lower side of the display unit 320.

In order to increase image brightness, the processor 310 may further choose to turn on the light sources 330 on at least one side of the first area 321 or the second area 322 based on the current driving speed, so as to enhance the display effect of the first area or the second area. For example, when the driving speed is high, the light sources 330 around the first area 321 instead of those around the second area 322 are turned on; when the driving speed is low, the light sources 330 around the second area 322 instead of those around the first area 321 are turned on. Apparently, embodiments of the present disclosure are not limited to this. For example, when the driving speed is high, the brightness of the light sources around the first area 321 are regulated upwards while the light sources around the second area 322 are regulated downwards; when the driving speed is low, the brightness of the light sources around the second area 322 are regulated upwards while the light sources around the first area 321 are regulated downwards. For another example, the light sources 330 may be controlled in such a way that brightness has gradational transition in areas of the display unit.

Figure 4B:
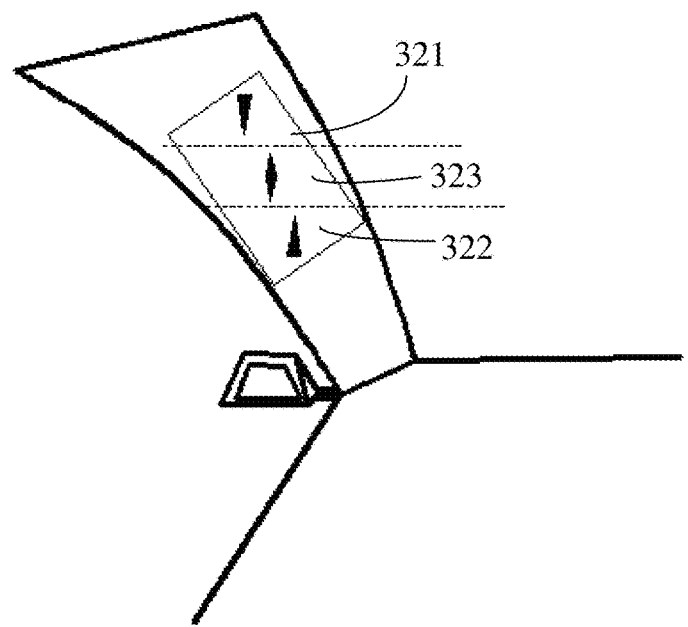
FIG. 4b is a schematic diagram illustrating another partitioning mode of areas of an A pillar display screen according to an embodiment of the present disclosure.

FIG. 4b shows another partitioning mode of areas according to an embodiment of the present disclosure. In this embodiment, the display unit 320 is divided into a first area 321, a second area 322 and a third area 323. As shown in FIG. 4b, in the order from top to bottom, the portion over the first dashed line is the first area 321, the portion between the first dashed line and the second dashed line is the second area 322 and the portion below the second dashed line is the third area 323. The processor 310 may choose to process the first parts of the first images displayed in the first area 321 and/or the second parts of the first images displayed in the second area 322 and/or the third parts of the first images displayed in the third area 323 based on the current driving speed, so as to enhance the display effect of the first area, or the second area, or the third area.

For example, according to an example of the present disclosure, the first parts of the first images are displayed in the first area 321 used to display images of distant scenes at a distance from the vehicle larger than the first distance threshold. The second parts of the first images are displayed in the second area 322 used to display images of near scenes at a distance from the vehicle smaller than the second distance threshold. The third parts of the first images are displayed in the third area 323 used to display images of scenes at a distance from the vehicle ranged between the first distance threshold and the second distance threshold. For example, the first distance threshold is 100 m while the second distance threshold is 50 m. The term "distance" refers to a distance between a location external to the vehicle, for example, either side of the traffic lane, and the vehicle. When having acquired the current driving speed of the vehicle, the processor 310 may set speed thresholds. For example, the first speed threshold is 80 km/h and the second speed is 30 km/h. Of course, it should be understood by those skilled in the art that those threshold values are only provided as an example, and the speed threshold and the distance threshold mentioned above may be set as required by actual traffic conditions, weather or other factors. When the processor 310 determines that the current driving speed of the vehicle is higher than the first speed threshold, it processes the first parts of the first images displayed in the first area 321 to enhance the display effect of the first area. When the current driving speed is lower than the second speed threshold, the second parts of the first images displayed in the second area 322 are processed to enhance the display effect of the second area. When the driving speed is higher than the second speed threshold and lower than the first speed threshold, the third parts of the first images displayed in the third area 323 are processed to enhance the display effect of the third area.

Likewise, while the display effect of one display area is enhanced, the display effect of the other two areas may be weakened, enabling the driver to pay attention to the area with enhanced display effect. For example, when the current driving speed is higher than the first speed threshold, the first parts of the first images are processed to enhance the display effect of the first area, and meanwhile the second and third parts of the first images are processed to weaken the display effect of the second and third areas. When the current driving speed is lower than the second speed threshold, the second parts of the first images are processed to enhance the display effect of the second area and meanwhile the first and third parts of the first images are processed to weaken the display effect of the first and third areas. When the current driving speed is higher than the second speed threshold and lower than the first speed threshold, the third parts of the first images are processed to enhance the display effect of the third area, and meanwhile the first and second parts of the first images are processed to weaken the display effect of the first and second areas.

Moreover, the light sources (e.g., LED light sources) may also be disposed on one side or both sides of the third area, or surrounding the third area. In order to increase brightness of the third area 323, the processor 310 may turn on or off light sources surrounding the third area 323, or adjust brightness of the light sources surrounding the third area 323 upwards or downwards according to the current driving speed, so as to increase or decrease the display brightness of the third area.

In an embodiment of the present disclosure, the display effect of a partial display area of the display unit may be adjusted according to the driving speed, so that the display effect of the area that needs attention to be paid by the driver is enhanced and thereby the driver may discriminate the traffic conditions blocked by A pillars, further improving driving safety.

Figure 6A:
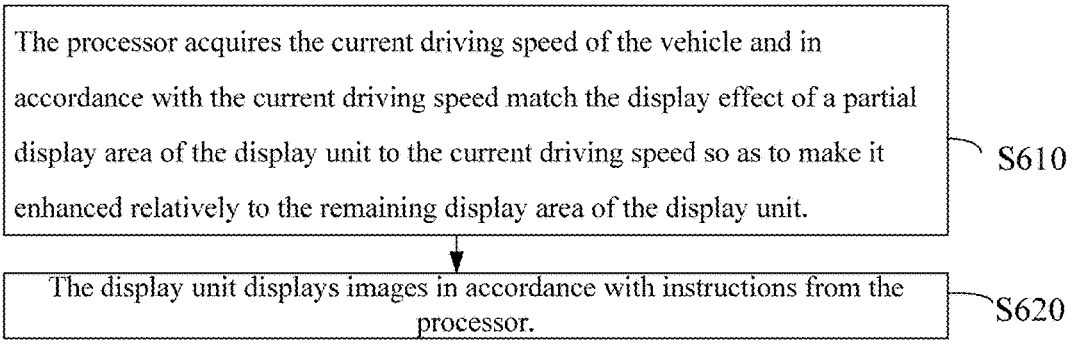
FIGS. 6a-6b are flow charts illustrating a display method for a vehicle auxiliary display device according to an embodiment of the present disclosure.

FIGS. 6a-6d show flow charts illustrating a display method for a vehicle auxiliary display device according to an embodiment of the present disclosure. The display method corresponds to the work flow of the display device in embodiments described above and will only be introduced briefly hereafter. The display device in the embodiments described above may be referenced for details. With reference to FIG. 6a, the display method 600 may include the following steps.

In step S610, the processor acquires the current driving speed of the vehicle and according to the current driving speed match the display effect of a partial display area of the display unit to the current driving speed so as to make it enhanced relatively to the remaining display area of the display unit.

Figure 6B:
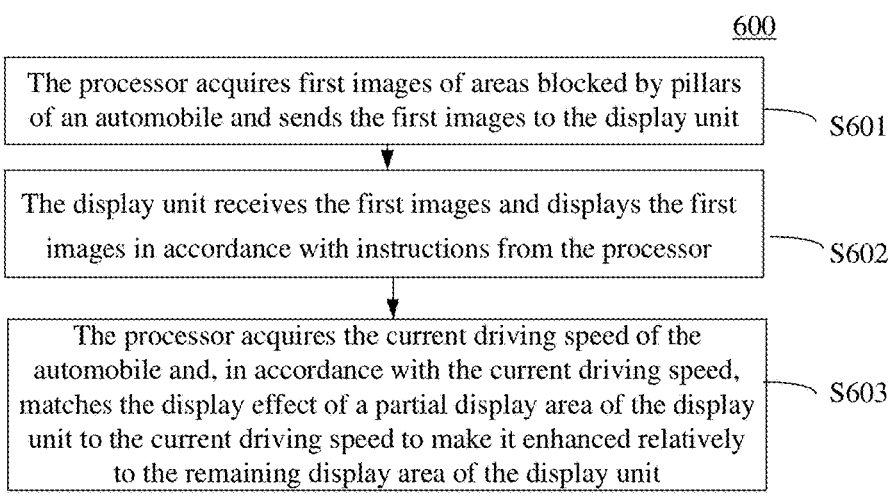

In step S620, the display unit displays images according to instructions from the processor. With reference to FIG. 6b, according to another embodiment of the present disclosure, the display method 600 may further include the following operations.

In step S601, the processor acquires first images of areas blocked by pillars of the vehicle and sends the first images to the display unit.

In step S602, the display unit receives the first images from the processor and displays the first images according to instructions from the processor.

In step S603, the processor acquires the current driving speed of the vehicle and according to the current driving speed match the display effect of a partial display area of the display unit to the current driving speed to make it enhanced relatively to the remaining display area of the display unit.

According to an example of the present disclosure, the display unit for areas blocked by pillars is divided into at least two areas and according to the current driving speed the first parts of the first images displayed in the first area and/or the second parts of the first images displayed in the second area are processed in such a way to enhance the display effect of the first area or the second area.

According to an example of the present disclosure, the first area displays images of distant scenes at a distance from the vehicle larger than the first distance threshold while the second area displays images of near scenes at a from the vehicle smaller than the first distance threshold. When the current driving speed is higher than the first speed threshold, the first parts of the first images are processed in such a way to enhance the display effect of the first area; when the current driving speed is lower than the first speed threshold, the second parts of the first images are processed in such a way to enhance the display effect of the second area.

According to an example of the present disclosure, when the current driving speed is higher than the first speed threshold, the first parts of the first images are processed to enhance the display effect of the first area while the second parts of the first images are processed to weaken the display effect of the second area.

According to an example of the present disclosure, when the current driving speed is lower than the first speed threshold, the second parts of the first images are processed to enhance the display effect of the second area while the first parts of the first images are processed to weaken the display effect of the first area.

According to an example of the present disclosure, the display unit further includes light sources disposed respectively on at least one side of the first area and at least one side of the second area and there may be a plurality of such light sources. In step S603, further based on the current driving speed, the light sources on at least one side of the first area or those on at least one side of the second area may be turned on to enhance the display effect of the first area or the second area.

According to an example of the present disclosure, the display unit for areas blocked by pillars may be divided into a first area, a second area and a third area, and in step S603 the first parts of the first images displayed in the first area and/or the second parts of the first images displayed in the second area and/or the third parts of the first images displayed in the third area may be processed according to the current driving speed to enhance the display effect of the first area or the second area or the third area.

According to an example of the present disclosure, the first area displays images of distant scenes at a distance from the vehicle larger than the first distance threshold. The second area displays images of near scenes at a distance from the vehicle smaller than the second distance threshold. The third area displays images of scenes at a distance from the vehicle ranged between the first distance threshold and the second distance threshold, with the third area of the display unit located between the first area and the second area.

According to an example of the present disclosure, when the current driving speed is higher than the first speed threshold, the first parts of the first images are processed to enhance the display effect of the first area. When the current driving speed is lower than the second speed threshold, the second parts of the first images are processed to enhance the display effect of the second area. When the current driving speed is higher than the second speed threshold and lower than the first speed threshold, the third parts of the first images are processed to enhance the display effect of the third area. The second distance threshold may be smaller than the first distance threshold.

According to an example of the present disclosure, while the display effect of one of the first, second and third areas is enhanced, the display effect of the other two areas is weakened. For example, when the current driving speed is higher than the first speed threshold, the first parts of the first images are processed to enhance the display effect of the first area, and meanwhile the second and third parts of the first images are processed to weaken the display effect of the second and third areas. When the current driving speed is lower than the second speed threshold, the second parts of the first images are processed to enhance the display effect of the second area and meanwhile the first and third parts of the first images are processed to weaken the display effect of the first and third areas. When the current driving speed is higher than the second speed threshold and lower than the first speed threshold, the third parts of the first images are processed to enhance the display effect of the third area and meanwhile the first and second parts of the first images are processed to weaken the display effect of the first and second areas.

Likewise, light sources may be disposed on at least one side of the third area. According to the current driving speed, the light sources around the first area or the second area or the third area may be turned on or off or have their brightness regulated upwards or downwards, so as to enhance the display effect of the first or second or third area.

In embodiments of the present disclosure, pictures displayed by the display unit are optimized according to the driving speed of the vehicle, so that the driver may be directed to devote his mind to safe driving; meanwhile, light sources are used to enhance or weaken display effects, saving energy for the whole system.

According to at least one embodiment of the present disclosure, a vehicle is provided, which includes the vehicle auxiliary display device in embodiments described above. The vehicle auxiliary display device may be disposed on a pillar of a vehicle, which may be, for example, an A pillar, a B pillar or a C pillar. For brevity of the specification, no description will be repeated here.

The skilled in the art may realize that, the units and arithmetic process in each example described with the embodiments disclosed in this disclosure can be achieved through electronic hardware, computer software or the combination of the both. Also, the software module may be set in any kinds of computer mediums. In order to describe clearly the interchangeability of hardware and software, the constitution and steps of each example have been described generally in terms of function in the description above. These functions is implemented with hardware or software is due to the specific application and design restriction condition of the technical solution. The skilled in the art may use different method to achieve the described function pointing to each specific application, however, the achievement should not be considered over the scope of this disclosure.

Those skilled in the art should appreciate that various modifications, combinations, sub-combinations and substitutions may be done depending on design requirements and other factors as long as they fall within the scope of the accompanying claims and their equivalents.

The present application claims priority of China patent application No. 201610720919.7 filed on Aug. 24, 2016, which is incorporated herein in its entirety by reference as a part of the present application.

The invention claimed is:

1. A vehicle auxiliary display device, comprising a display unit, an image acquiring unit, and a processor, wherein
the processor is configured to acquire a current driving speed of a vehicle and, according to the current driving speed, match a display effect of a partial display area of the display unit to the current driving speed so as to enhance the display effect of the partial display area relative to a remaining display area of the display unit,
the display unit is configured to display images according to instructions from the processor,
the display unit comprises at least a first area and a second area,
the image acquiring unit is configured to acquire first images and send the first images to the processor, and
the processor is further configured to process a first part of the first images to weaken the display effect of the first area when the current driving speed is lower than a first speed threshold,
wherein the processor is further configured to process a second part of the first images in such a way as to enhance the display effect of the second area when the current driving speed is lower than the first speed threshold; and
wherein the processor is further configured to send the processed first images to the display unit, wherein the processor is further configured to process the second part of the first images in such a way as to weaken the display effect of the second area when the current driving speed is higher than the first speed threshold.

2. The display device of claim 1, wherein
the first area is used to display images of distant scenes which are located at a distance from the vehicle larger than a first distance threshold; and
the second area is used to display images of near scenes which are located at a distance from the vehicle smaller than the first distance threshold.

3. The display device of claim 1, wherein the display device further comprises a plurality of light sources,
the plurality of light sources are respectively disposed on at least one side of the first area and at least one side of the second area of the display unit, and
the processor is further configured to turn on the light sources on at least one side of the first area or those on at least one side of the second area to enhance the display effect of the first or second area according to the current driving speed.

4. The display device of claim 1, wherein
the display unit further comprises a third area located between the first area and the second area and used to display a third part of the first images; and
the processor is further configured to process the first part of the first images displayed in the first area, the second part of the first images displayed in the second area, or the third part of the first images displayed in the third area according to the current driving speed so as to enhance the display effect of the first, second, or third area.

5. The display device of claim 4, wherein
the first area is used to display images of distant scenes which are located at a distance from the vehicle larger than a first distance threshold;
the second area is used to display images of near scenes which are located at a distance from the vehicle smaller than a second distance threshold, the second distance threshold being smaller than the first distance threshold; and
the third area is used to display images of scenes which are located at a distance from the vehicle ranged between the first distance threshold and the second distance threshold.

6. The display device of claim 5, wherein the processor is further configured to:
process the first part of the first images to enhance the display effect of the first area when the current driving speed is higher than the first speed threshold;
process the second part of the first images to enhance the display effect of the second area when the current driving speed is lower than a second speed threshold; and
process the third part of the first images to enhance the display effect of the third area when the current driving speed is higher than the second speed threshold and lower than the first speed threshold.

7. The display device of claim 6, wherein the processor is further configured to enhance the display effect of one of the first, second, and third areas, and meanwhile weaken the display effect of the other two areas.

8. The display device of claim 1, wherein a plurality of light sources included in the display device are respectively disposed on at least one side of the first area, at least one side of the second area, and at least one side of a third area of the display unit, and
the processor is further configured to turn on the light sources around the first area, the second area, or the third area according to the current driving speed so as to enhance the display effect of the first, second, or third area.

9. A vehicle, comprising the vehicle auxiliary display device of claim 1.

10. The display device of claim 1, wherein the processor is further configured to process the first part of the first images in such a way as to enhance the display effect of the first area when the current driving speed is higher than the first speed threshold.

11. A display method for a vehicle auxiliary display device, wherein the vehicle auxiliary display device comprises a display unit, an image acquiring unit, and a processor, the display method comprising:
acquiring, by the processor, a current driving speed of a vehicle and, according to the current driving speed, matching a display effect of a partial display area of the display unit to the current driving speed to make it enhanced relative to a remaining display area of the display unit; and
displaying, by the display unit according to instructions from the processor, images,
wherein the display unit comprises at least a first area and a second area,
the image acquiring unit acquires first images and sends the first images to the processor, and
wherein, when the current driving speed is lower than a first speed threshold, the processor processes a first part of the first images to weaken the display effect of the first area,
wherein the display method further comprises: processing, by the processor, a second part of the first images to enhance the display effect of the second area when the current driving speed is lower than the first speed threshold; and
sending the processed first images to the display unit for display,
wherein the display method further comprises: when the current driving speed is higher than the first speed threshold, processing, by the processor, the second part of the first images to weaken the display effect of the second area.

12. The display method of claim 11, wherein the first area is used to display images of distant scenes which are located at a distance from the vehicle larger than a first distance threshold; and
the second area is used to display images of near scenes which are located at a distance from the vehicle smaller than the first distance threshold.

13. The display method of claim 11, wherein the display device further comprises a plurality of light sources, and
the plurality of light sources are disposed respectively on at least one side of the first area and at least one side of the second area of the display unit,
the method further comprising: turning on, by the processor, the light sources on at least one side of the first area or those on at least one side of the second area according to the current driving speed to enhance the display effect of the first area or the second area.

14. The display method of claim 11, wherein
the display unit further comprises a third area located between the first area and the second area and used to display a third part of the first images,
the method further comprising: processing, by the processor, the first part of the first images displayed in the first area, the second part of the first images displayed in the second area, and the third part of the first images displayed in the third area to enhance the display effect of the first, second, or third area.

15. The display method of claim 14, wherein
the first area is used to display images of distant scenes which are located at a distance from the vehicle larger than a first distance threshold;
the second area is used to display images of near scenes which are located at a distance from the vehicle smaller than a second distance threshold, the second distance threshold being smaller than the first distance threshold; and
the third area is used to display images of scenes which are located at a distance from the vehicle ranged between the first distance threshold and the second distance threshold.

16. The display method of claim 11, further comprising:
processing, by the processor, the first part of the first images to enhance the display effect of the first area when the current driving speed is higher than the first speed threshold.

* * * * *